US010142912B2

(12) United States Patent
Inoue et al.

(10) Patent No.: US 10,142,912 B2
(45) Date of Patent: Nov. 27, 2018

(54) SINK NODE, SENSOR NETWORK SYSTEM, INFORMATION COLLECTION METHOD, AND INFORMATION COLLECTION PROGRAM

(71) Applicant: OMRON Corporation, Kyoto-shi, Kyoto (JP)

(72) Inventors: Yuki Inoue, Sakai (JP); Hiroshi Sameshima, Nara (JP); Ryota Akai, Otsu (JP); Tomohiro Ozaki, Otsu (JP)

(73) Assignee: OMRON Corporation, Kyoto-shi (JP)

( * ) Notice: Subject to any disclaimer, the term of this patent is extended or adjusted under 35 U.S.C. 154(b) by 0 days.

(21) Appl. No.: 15/541,624

(22) PCT Filed: Jan. 26, 2016

(86) PCT No.: PCT/JP2016/052081
§ 371 (c)(1),
(2) Date: Jul. 5, 2017

(87) PCT Pub. No.: WO2016/121719
PCT Pub. Date: Aug. 4, 2016

(65) Prior Publication Data
US 2017/0359767 A1 Dec. 14, 2017

(30) Foreign Application Priority Data
Jan. 28, 2015 (JP) ................. 2015-014815

(51) Int. Cl.
*H04W 40/24* (2009.01)
*G08C 15/06* (2006.01)
(Continued)

(52) U.S. Cl.
CPC ............ *H04W 40/24* (2013.01); *G08C 15/06* (2013.01); *H04Q 9/00* (2013.01); *H04W 48/16* (2013.01);
(Continued)

(58) Field of Classification Search
CPC ..... H04W 40/24; H04W 48/16; H04W 74/00; H04W 74/06; H04W 74/0833;
(Continued)

(56) References Cited

U.S. PATENT DOCUMENTS

2002/0142778 A1\* 10/2002 Saito ................. H04W 36/04
455/450
2008/0212557 A1\* 9/2008 Chiricescu ............ G01D 21/00
370/345
(Continued)

FOREIGN PATENT DOCUMENTS

EP 1531440 A2 5/2005
JP 2010-283587 A 12/2010

OTHER PUBLICATIONS

The extended European search report (EESR) dated Dec. 15, 2017 in a counterpart European patent application.

*Primary Examiner* — Warner Wong
(74) *Attorney, Agent, or Firm* — Metrolexis Law Group, PLLC

(57) ABSTRACT

A sink node forming a sensor network system with one or more sensor nodes includes a communication time period allocation means for allocating, to a target sensor node, a communication time period for measurement information transmission by the target sensor node, to not overlap a communication time period for measurement information transmission by a node related to a wireless communication environment between the target sensor node and sink node, concerning measurement information transmission by a sensor target sensor node other than the target sensor node among the one or more sensor nodes. The communication time period allocation means adjusts a communication time period allocated for subsequent measurement information to be transmitted by the target sensor node, based on a predetermined wireless communication parameter related to the
(Continued)

wireless communication environment between the target sensor node and sink node, concerning measurement information transmission by the target sensor node.

5 Claims, 10 Drawing Sheets

(51) Int. Cl.
*H04Q 9/00* (2006.01)
*H04W 48/16* (2009.01)
*H04L 12/911* (2013.01)
*H04L 27/26* (2006.01)
*H04W 74/00* (2009.01)
*H04L 12/733* (2013.01)
*H04W 40/02* (2009.01)
*H04W 74/06* (2009.01)

(52) U.S. Cl.
CPC ......... *H04L 27/2646* (2013.01); *H04L 45/20* (2013.01); *H04L 47/823* (2013.01); *H04Q 2209/10* (2013.01); *H04Q 2209/753* (2013.01); *H04W 40/02* (2013.01); *H04W 74/00* (2013.01); *H04W 74/06* (2013.01)

(58) Field of Classification Search
CPC ......... G08C 15/06; H04L 45/20; H04L 45/28; H04L 5/0078; H04L 25/03; H04L 27/2646; H04L 41/0816; H04L 47/127; H04L 47/823; H04L 47/826; H04L 56/00; H04L 56/0045; H04L 74/00; H04L 74/0833
See application file for complete search history.

(56) References Cited

U.S. PATENT DOCUMENTS

| | | | |
|---|---|---|---|
| 2010/0128706 A1* | 5/2010 | Lee | H04W 52/0216 370/338 |
| 2011/0029655 A1 | 2/2011 | Forbes, Jr. et al. | |
| 2012/0093087 A1* | 4/2012 | Chen | H04L 45/025 370/328 |
| 2012/0307702 A1* | 12/2012 | Nakae | H04W 48/12 370/311 |
| 2013/0281131 A1* | 10/2013 | Hasegawa | H04W 52/0251 455/456.4 |
| 2014/0241171 A1* | 8/2014 | Moon | H04L 25/0398 370/242 |

* cited by examiner

FIG. 5

| Start Symbol 4 Byte | Legth of Destination Address 1 Byte | Destination Address 0 – 255 Byte | Length of Source Address 1 Byte | Source Address 0 – 255 Byte | Length of Data 2 Byte | Data 0 – 65535 Byte | Terminator Symbol for Data 4 Byte |
|---|---|---|---|---|---|---|---|
| a1 | | a2 | | a3 | | a4 | a5 |

FIG. 7
(a)
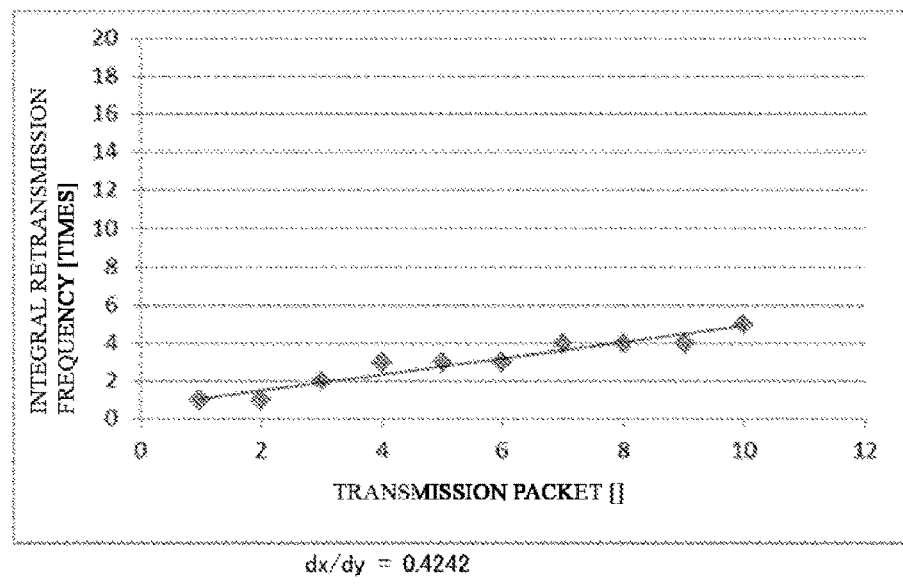
dx/dy = 0.4242
INTEGRAL RETRANSMISSION FREQUENCY = 4.242
(b)
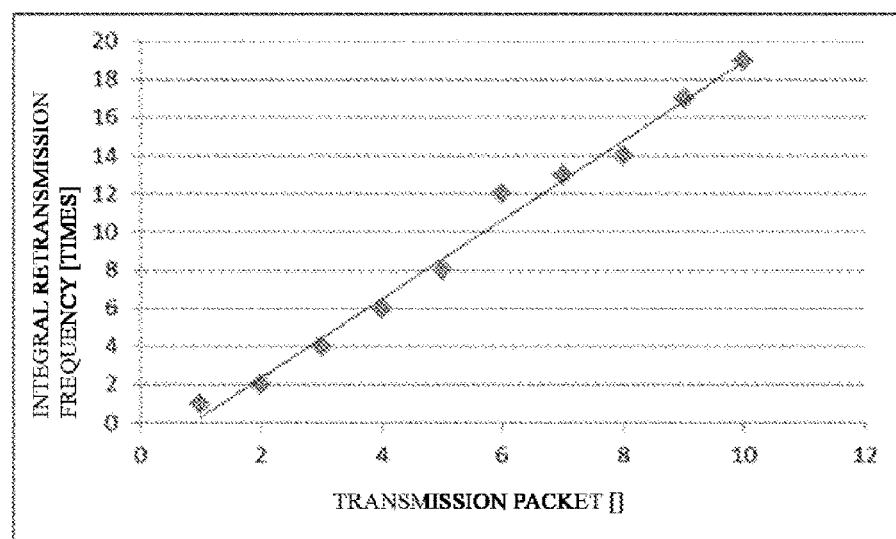
dx/dy = 2.0727
INTEGRAL RETRANSMISSION FREQUENCY = 20.727

SINK NODE, SENSOR NETWORK SYSTEM, INFORMATION COLLECTION METHOD, AND INFORMATION COLLECTION PROGRAM

TECHNICAL FIELD

The present invention relates to a sink node that collects measurement information from a sensor node provided with a sensor, and to a sensor network system that consists of the sink node and the sensor node.

RELATED ART

Heretofore, technologies have been developed that enables large amounts of measurement information to be easily collected, by utilizing a sensor module that measures environmental parameters such as temperature and humidity, and transmitting that measured information to an information processing apparatus via a network. In this case, a wireless network for transmitting measured information is formed, as a result of provided the sensor module with a wireless function. With regard to a wireless network that is built utilizing a sensor module that is useful for thus increasing the efficiency of information collection, Patent Document 1, for example, discloses a wireless sensor network that is constituted by a node for transmitting measurement data of a sensor, a router that performs relay, and a base that receives the measurement data from the router. In this network, attachment of channel information to measurement data is performed by the node, and the router periodically transmits survival information for the network, with channel information also being added at this time. As a result of such a network being formed, channel information is conveyed together with measurement data to the base that receives information, enabling the situation of the router to be readily ascertained.

RELATED ART DOCUMENTS

Patent Documents

Patent Document No. 2010-283587

SUMMARY OF THE INVENTION

Problems to be Solved by the Invention

In a sensor network system that is constituted by sensor nodes that measure environmental parameters such as temperature and humidity and a sink node in which the measurement information is collected via wireless communication between the nodes, the measurement information that is measured with the sensor nodes needs to be sequentially transmitted to the sink node side, and thus a communication time period for information transmission between the sensor nodes and the sink node is allocated to each sensor node. With the conventional technologies, the communication time period for information transmission is set with consideration for factors such as the estimated volume of measurement information and the communication speed between nodes.

Here, the environment of wireless communication between the sensor nodes and the sink node can change depending on various communication factors, rather than always being constant. Thus, a situation where it is difficult to finish transmitting measurement information obtained by a sensor node to the sink node side within the communication time period initially allocated can arise, in which case the measurement information is stored as long as the storage capacity of a memory or the like provided in the sensor node allows. However, the capacity of such a memory or the like is limited, and if the wireless communication environment between the nodes is not favorable, the capacity of the memory will eventually be insufficient. In that case, the opportunity to collect part of the measurement information in some form is lost due, for instance, to no longer being able to transmit newly measured information to the sink node because of not being able to store the measurement information in memory, or to erasing past measurement information that is stored in memory (measurement information that has not, however, been transmitted to the sink node) in order to preferentially store newly measured information in memory, and thus efficient collection of measurement information is hindered.

Also, in the case where the collection of measurement information demands real-timeliness, transmission of measurement information that is required at as close to a predetermined timing as possible to the sink node is demanded. However, when a situation arises where it is difficult to finish transmitting measurement information to the sink node side within the communication time period initially allocated such as mentioned above, this demand cannot be fulfilled and efficient collection of measurement information is nevertheless hindered.

The present invention was made in view of such problems, and has an object of providing, in a sensor network system that is formed with a sensor node and a sink node, a technology for efficiently collecting measurement information that is in the sensor node.

Means for Solving the Problems

In the present invention, in order to solve the above problems, a configuration is adopted in which a sink node acquires a parameter related to a wireless communication environment between the sink node and a sensor node, and adjusts an allocation time period for wireless communication with the sensor node based on the acquired parameter. A communication time period for information collection that depends on the wireless communication environment between both nodes can thereby be appropriately set, thus enabling efficient information collection.

Specifically, the present invention is a sink node in which measurement information in each of one or more sensor nodes is collected, via wireless communication with the one or more sensor nodes, which each have a sensor that measures a predetermined environmental parameter and a memory that stores measurement information measured by the sensor, the sink node including a receiving means for receiving the measurement information from a target sensor node which is the sensor node that measured the measurement information, a communication time period allocation means for allocating, to the target sensor node, a communication time period for transmission of the measurement information by the target sensor node, so as to not overlap with a communication time period for transmission of measurement information by a sensor node other than the target sensor node among the one or more sensor nodes, and an acquisition means for acquiring a predetermined wireless communication parameter related to a wireless communication environment between the target sensor node and the sink node, concerning transmission of the measurement information by the target sensor node. The communication time period allocation means adjusts a communication time period allocated for subsequent measurement information which is measurement information to be transmitted after the measurement information in the target sensor node, based on the predetermined wireless communication parameter acquired by the acquisition means.

The sink node according to the present invention is constituted such that measurement information measured with one or more sensor nodes is transmitted to the sink node side, via wireless communication with the one or more sensor nodes. That is, with the above information transmission, in the communication time period allocated to each sensor node by the communication time period allocation means, the sensor node transmits measurement information measured thereby via wireless communication, and that measurement information is received on the sink node side by the receiving means. Note that the above target sensor node refers to one arbitrary sensor node among the one or more sensor nodes that performs the above transmission of measurement information with the sink node, and does not restrictively refer to a specific sensor node that is included among the one or more sensor nodes.

Here, allocation of the communication time period by the communication time period allocation means is set such that the communication time periods allocated to the respective sensor nodes do not overlap, so as to enable collection of measurement information from the sensor nodes that are wirelessly connected to the sink node, based on factors such as the volume of the measurement information that is measured by each sensor node and the communication speed between the sensor nodes and the sink node. However, there are cases where the estimated communication speed or the like is not obtained, depending on the wireless communication environment between the sensor nodes and the sink node. In such cases, part of the measurement information cannot be transmitted from the sensor nodes to the sink node side within the allocated time period, and depending on the wireless communication environment, the measurement information that has not been transmitted is stored in a memory of each sensor node, and efficient collection of measurement information by the sink node will be hindered.

Taking this point into account, the sink node according to the present invention acquires a predetermined wireless communication parameter related to the wireless communication environment between the sink node and the target sensor node using the acquisition means and, utilizing the acquired parameter, the communication time period allocation means adjusts the communication time period. The predetermined wireless communication parameter is a parameter related to the wireless communication environment that exerts an influence on the time period required when transmitting measurement information from the target sensor node to the sink node. Accordingly, it becomes possible to ascertain whether the communication time period for transmission of measurement information from the target sensor node is an appropriate time period according to the wireless communication environment for the transmission, as a result of the sink node acquiring the predetermined wireless communication parameter. When the communication time period is shorter than the time period required for transmission of the measurement information that takes account of the wireless communication environment, the amount of measurement information that has not been transmitted increases in the target sensor node as a result, but needlessly lengthening the communication time period is also not possible, given the relationship between the measurement interval and the transmission time period of the measurement information.

In view of this, the communication time period allocation means adjusts the communication time period for subsequent measurement information to be transmitted from the target sensor node, so as to finish transmitting the measurement information that is in the sensor node to the sink node side with account for the wireless communication environment between the nodes that is inferred from the acquired predetermined wireless communication parameter. For example, in the case where the predetermined wireless communication parameter is a parameter that signifies that a longer time period will be required for transmission of measurement information, the communication time period for subsequent measurement information is adjusted so as to be longer than the communication time period that had been allocated up to that point. Transmission of measurement information from the target sensor node to the sink node will thereby be efficiently performed, and collection of measurement information that demands real-timeliness is also suitably realized. Note that adjustment of the communication time period by the communication time period allocation means is processing that is performed for every target sensor node. This is because the wireless communication environment between each sensor node and the sink node respectively differ, and thus adjustment of the communication time period by the communication time period allocation means is performed according to the respective wireless communication environments.

Also, the communication time period that is adjusted by the communication time period allocation means is the communication time period for subsequent measurement information that will be transmitted, after the measurement information (hereinafter, "basis measurement information") associated with the wireless communication parameter serving as the basis for the adjustment. Although the subsequent measurement information is preferably the measurement information directly after the basis measurement information, a configuration in which subsequent measurement information is transmitted in the adjusted communication time period after one or more pieces of measurement information have been transmitted after the basis measurement information is transmitted also belongs to the scope of the present invention. Subsequent measurement information may also include measurement information, stored in the memory of a sensor node, that was originally to be have been transmitted in the allocated communication time period together with the basis measurement information but cannot be transmitted due to the wireless communication environment.

Here, in the sink node, the acquisition means may acquire the predetermined wireless communication parameter generated by the target sensor node via the receiving means. With such a configuration, the predetermined wireless communication parameter will be generated on the target sensor node side, and transmitted to the sink node side in the same manner as measurement information. Accordingly, the predetermined wireless communication parameter is a parameter related to the wireless communication environment with the sink node that can be ascertained in the target sensor node, with the retransmission frequency required when the target sensor node transmits measurement information being given as an example.

Also, the sink node described heretofore may further include a prediction means for predicting, based on the predetermined wireless communication parameter acquired by the acquisition means, that an information transmission time period required for transmission of the measurement information between the target sensor node and the sink node will become longer than the communication time period allocated to the target sensor node before adjustment by the communication time period allocation means. In this case, the communication time period allocation means extends the communication time period allocated for the subsequent measurement information in the target sensor node, when an increase in the information transmission time period is predicted by the prediction means. As a result of the communication time period thus being extended by the communication time period allocation means in the case where an increase in the communication time period is predicted by the prediction means, it becomes possible to finish transmitting the measurement information that is in the target sensor node in the communication time period that is allocated for measurement information. Thus, the storage of measurement information that cannot be transmitted within the communication time period in the memory of the target sensor node can be avoided as much as possible, enabling more efficient collection of measurement information.

Here, prediction of an increase in the information transmission time period by the prediction means will be referred to. For example, in the case where the predetermined wireless communication parameter is the retransmission frequency that occurs when the measurement information is transmitted between the target sensor node and the sink node in the communication time period that is allocated to the target sensor node, the prediction means may be configured to predict an increase in the information transmission time period, by comparing the retransmission frequency or a retransmission parameter of some sort associated with the retransmission frequency and a predetermined threshold value. When the wireless communication environment between the target sensor node and the sink node becomes unfavorable (deteriorates), it becomes less likely that the measurement information transmitted from the target sensor node will reach the sink node, and, as a result, the retransmission frequency of the measurement information from the target sensor node will increase. An increase in the retransmission frequency can be considered to suggest a tendency for the information transmission time period to increase. In view of this, by focusing on this retransmission frequency as the predetermined wireless communication parameter, an increase in the information transmission time period can be rationally predicted, depending on what kind of value the retransmission frequency or a retransmission parameter related thereto takes relative to a predetermined threshold value, which is a threshold value for judging an increase in the information transmission time period.

In the mode described heretofore, the predetermined wireless communication parameter was generated on the target sensor node side, but instead the acquisition means may generate, on the sink node side, the predetermined wireless communication parameter concerning transmission of the measurement information from the target sensor node. In such a mode, the predetermined wireless communication parameter is a parameter related to the wireless communication environment with the target sensor node that can be ascertained in the sink node. As an example thereof, the predetermined wireless communication parameter is a received signal strength indicator (RSSI) in wireless communication between the target sensor node and the sink node that is measured in the sink node. In this case, the communication time period allocation means extends the communication time period allocated for the subsequent measurement information in the target sensor node, when the received signal strength indicator in the communication time period that is allocated to the target sensor node is less than a predetermined strength.

Here, in the sink node described heretofore, a configuration may be adopted in which the communication time period allocation means, in a case where information transmission between the target sensor node and the sink node is not possible, does not perform adjustment of the communication time period for the subsequent measurement information in the target sensor node. In principle, the communication time period allocation means, in the case where the value of the predetermined wireless communication parameter represents an increase in the transmission time period of measurement information between the target sensor node and the sink node, may extend the communication time period according to the extent of the increase in the transmission time period. However, in a state where information transmission between the target sensor node and the sink node is not possible, transmitting measurement information will be difficult even if the communication time period is extended. In view of this, by not extending the communication time period in such cases, needlessly allocating a long communication time period can be avoided.

The instant invention can be also be taken from the aspect of a sensor network system having one or more sensor nodes that each have a sensor that measures a predetermined environmental parameter and a memory that stores measurement information measured by the sensor, and a sink node in which measurement information measured by each of the sensor nodes is collected, via wireless communication with the one or more sensor nodes. In this case, the sink node includes a receiving means for receiving the measurement information from a target sensor node that measured the measurement information, a communication time period allocation means for allocating, to the target sensor node, a communication time period for transmission of the measurement information by the target sensor node, so as to not overlap with a communication time period for transmission of measurement information by a sensor node other than the target sensor node among the one or more sensor nodes, and an acquisition means for acquiring a predetermined wireless communication parameter related to a wireless communication environment between the target sensor node and the sink node, concerning transmission of the measurement information by the target sensor node. The communication time period allocation means adjusts a communication time period allocated for subsequent measurement information which is measurement information to be transmitted after the measurement information in the target sensor node, based on the predetermined wireless communication parameter acquired by the acquisition means.

Here, in the sensor network system, the target sensor node may include a transmission means for generating, on the target sensor node side, the predetermined wireless communication parameter, and transmitting the generated predetermined wireless communication parameter to the sink node, and the acquisition means may acquire the predetermined wireless communication parameter transmitted by the transmission means, via the receiving means. Also, as a different method, a configuration may be adopted in which the acquisition means generates, on the sink node side, the predetermined wireless communication parameter concerning transmission of the measurement information from the target sensor node. Note that it is possible to apply the technical idea disclosed in relation to the invention of the sink node to the invention of the sensor network system as long as a technical contradiction does not occur.

The instant invention can also be taken from the aspect of an information collection method of a sink node in which measurement information measured by each of one or more sensor nodes is collected, via wireless communication with the one or more sensor nodes, which each have a sensor that measures a predetermined environmental parameter and a memory that stores measurement information measured by the sensor. In this case, the information collection method includes a step of receiving the measurement information from a target sensor node which is the sensor node that measured the measurement information, a step of allocating, to the target sensor node, a communication time period for transmission of the measurement information by the target sensor node, so as to not overlap with a communication time period for transmission of measurement information by a sensor node other than the target sensor node among the one or more sensor nodes, a step of acquiring a predetermined wireless communication parameter related to a wireless communication environment between the target sensor node and the sink node, concerning transmission of the measurement information by the target sensor node, and a step of adjusting a communication time period allocated for subsequent measurement information which is measurement information to be transmitted after the measurement information in the target sensor node, based on the acquired predetermined wireless communication parameter. Note that it is possible to apply the technical idea disclosed in relation to the invention of the sink node to the invention of the information collection method as long as a technical contradiction does not occur.

The instant invention can also be taken from the aspect of an information collection program for causing a sink node in which measurement information measured by each of one or more sensor nodes is collected, via wireless communication with the one or more sensor nodes, which each have a sensor that measures a predetermined environmental parameter and a memory that stores measurement information measured by the sensor, to execute processing consisting of the following steps. In this case, the information collection program causes the sink node to execute a step of receiving the measurement information from a target sensor node which is the sensor node that measured the measurement information, a step of allocating, to the target sensor node, a communication time period for transmission of the measurement information by the target sensor node, so as to not overlap with a communication time period for transmission of measurement information by a sensor node other than the target sensor node among the one or more sensor nodes, a step of acquiring a predetermined wireless communication parameter related to a wireless communication environment between the target sensor node and the sink node, concerning transmission of the measurement information by the target sensor node, and a step of adjusting a communication time period allocated for subsequent measurement information which is measurement information to be transmitted after the measurement information in the target sensor node, based on the acquired predetermined wireless communication parameter. Note that it is possible to apply the technical idea disclosed in relation to the invention of the sink node to the invention of the information collection program as long as a technical contradiction does not occur.

Effects of the Invention

In a sensor network system that is formed with a sensor node and a sink node, it becomes possible to efficiently collect measurement information that is in the sensor node.

BRIEF DESCRIPTION OF THE DRAWINGS

FIG. 5 is a diagram schematically showing a data structure of transmission information or wireless communication parameter information that is transmitted as a result of the measurement information transmitting processing shown in FIG. 4.

FIG. 7 illustrates diagrams (a) and (b) showing examples of correlation between the number of packets that are transmitted via wireless communication between nodes in the sensor network system shown in FIG. 1 and the retransmission frequency of the packets.

EMBODIMENTS OF THE INVENTION

A sensor network system (hereinafter, may also be simply referred to as the "system") 10 according to the present invention and a sink node 1 and sensor nodes 2 and 3 that are included in the system will be described with reference to the drawings. Note that the configurations of the following embodiments are merely by way of example, and the present invention is not limited to the configurations of these embodiments.

First Embodiment

Figure 1:
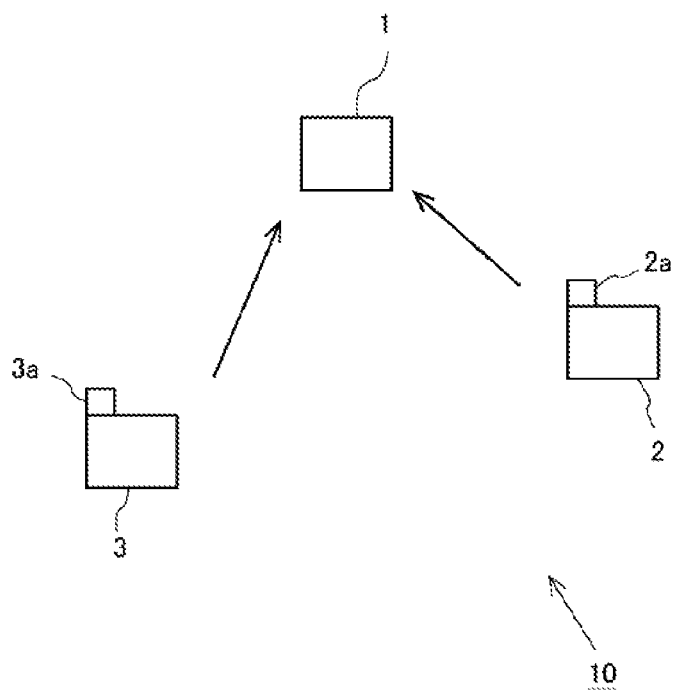
FIG. 1 is a diagram showing the schematic configuration of a sensor network system according to the present invention.

FIG. 1 is a diagram showing a schematic configuration of the system 10. In the system 10, a transmission channel via wireless communication is formed between the sink node 1 and each of the sensor nodes 2 and 3 in which a sensor for measuring various external environmental parameters (temperature, humidity, acceleration, etc.) is mounted. The sensor of the sensor node 2 is denoted as 2a, and the sensor of the sensor node 3 is denoted as 3a. Note that, in the system 10 shown in FIG. 1, only two sensor nodes 2 and 3 are wirelessly connected to the sink node 1 in order to simplify description of the instant invention, but three or more sensor nodes may be wirelessly connected to the sink node 1. Also, a plurality of sink nodes may be included in the system 10, in which case one or more sensor nodes are wirelessly connected to each sink node.

Sensors that may be mounted in the sensor nodes 2 and 3 include, for example, physical-type sensors such as a temperature sensor, a humidity sensor, an illuminance sensor, a flow sensor, a pressure sensor, a soil temperature sensor and a particle sensor, and chemical-type sensors such as a $CO_2$ sensor, a pH sensor, an EC sensor and a soil moisture sensor. In the present embodiment, in order to simplify description, only a temperature sensor for measuring the external temperature at the position where the sensor nodes 2 and 3 are respectively disposed is mounted in the sensor nodes 2 and 3.

In the system that is constituted in this manner, temperature information measured with the sensor nodes 2 and 3 is collected in the sink node 1 via wireless communication between each sensor node and the sink node 1. At this time, the allocation of communication time periods of wireless communication between the respective sensor nodes and the sink node 1 for transmission of temperature information from the sensor nodes is performed on the sink node 1 side so as to not overlap each other, and the time between each sensor node and the sink node 1 is synchronized. Accordingly, as a result of each sensor node utilizing the communication time period that is allocated thereto by the sink node 1 to transmit temperature information measured by the sensor node to the sink node 1 side, it becomes possible, as the system 10, to continuously collect the temperature information of the location where each sensor node is disposed. Note that the communication time period that is allocated to each sensor node is initially set to a predetermined reference communication time period, with consideration for the volume and estimated wireless communication speed of temperature information to be transmitted during one communication time period, avoidance of overlapping communication time periods between the respective sensor nodes, margins and the like.

Also, the sensor nodes 2 and 3 shown in FIG. 1 are constituted as compact devices (computers) in which functions such as a sensing function of measuring a measurement candidate, a function of recording or processing measured temperature information, a wireless communication function to outside the sensor node, a power supply function and a function relating to transmission control of temperature information via wireless communication are implemented, and the sink node 1 is constituted as a compact device (computer) in which functions such as a wireless communication function with the sensor nodes, a power supply function and a function relating to transmission control of temperature information via wireless communication are implemented. Note that the power supply function of the sensor nodes 2 and 3 is realized by an internal battery (cell) that supplies power for driving each function.

Here, in the system 10, when measurement by the sensors in the sensor nodes 2 and 3 is performed, the resultant temperature information will be sent to the sink node 1. However, in the case of transmitting temperature information via wireless communication, there is the possibility of no longer being able to realize suitable information transmission, due to reasons relating to the wireless communication environment such as radio wave interference being received from another wireless apparatus outside the transmission channel or an obstacle existing between nodes. As abovementioned, the communication time period for the information transmission from each sensor node is allocated by the sink node 1, and when the wireless communication environment between nodes deteriorates and the time period required for information transmission increases, information transmission within the allocated time period become difficult, and efficient collection of temperature information is hindered. Even though a storage unit that stores measured temperature information is provided in the sensor nodes 2 and 3 as will be discussed later, the storage capacity thereof is limited, and even if temperature information that cannot be transmitted within the communication time period that is allocated is temporarily stored, it may not be possible to store all of the temperature information that is not transmitted.

In view of this, in the system 10 according to the present invention, in relation to transmission of temperature information via wireless communication between each sensor node and the sink node 1, processing for adjusting the communication time period that is allocated to each sensor node according to the wireless communication environment between the sensor node and the sink node 1 is performed. Even in the case where wireless communication environment has deteriorated, the possibility that communication of temperature information to be transmitted will be finished within the allocated communication time period thereby increases, thus enabling the collection efficiency of temperature information for the system 10 as a whole to be maintained at a high level.

Figure 2:
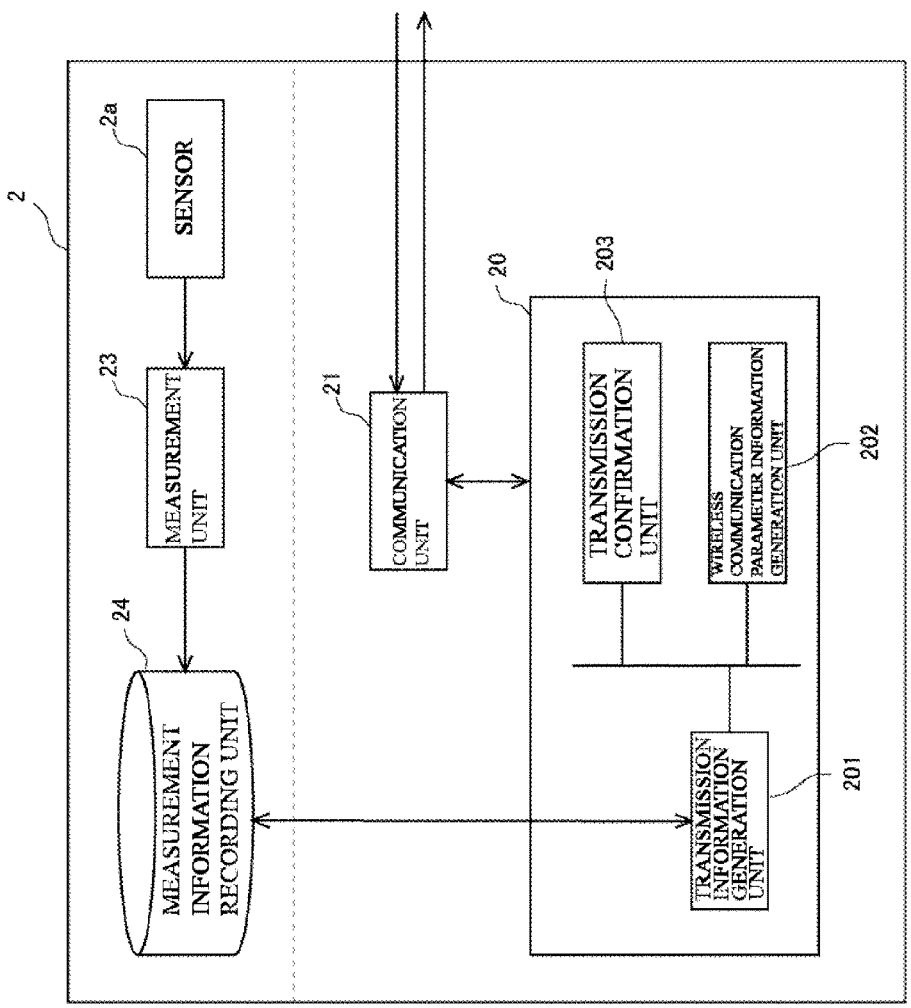
FIG. 2 is a functional block diagram of a sensor node that is included in the sensor network system shown in FIG. 1.

The specific processing by the sensor nodes 2 and 3 and the sink node 1 in the system 10 will be described, taking the above into account. The sensor nodes 2 and 3 and the sink node 1 are internally provided with a computational device, a memory, and the like, and various functions are exhibited as a result of a predetermined control program being executed by the computational device. First, FIG. 2 shows functional blocks that visualize some of the various functions that are exhibited by the sensor node 2 belonging to the system 10. Note that while the is functional blocks of the sensor node 2 are illustrated in FIG. 2, the sensor node 3 also has similar functions to the sensor node 2, and thus description thereof will be omitted.

The sensor node 2 has, as functional units, a control unit 20, a communication unit 21, a measurement unit 23 and a measurement information recording unit 24, and in the case of the present embodiment, a temperature sensor is mounted as the sensor 2a. Hereinafter, each functional unit that is provided in the sensor node 2 will be described. The control unit 20 is a functional unit that administers various controls in the sensor node 2, and, in particular, has a transmission information generation unit 201, a wireless communication parameter information generation unit 202 and a transmission confirmation unit 203. This transmission information generation unit 201 is a functional unit that generates transmission information including temperature information measured by the sensor 2a. This transmission information is the information that is transmitted to the sink node 1 by the communication unit 21 via wireless communication.

Also, the wireless communication parameter information generation unit 202 is a functional unit that generates wireless communication parameter information including the wireless communication parameter related to the wireless communication environment between the sensor node 2 and the sink node 1. This wireless communication parameter is a parameter related to the wireless communication environment that exerts an influence on the time period for transmitting the transmission information from the sensor node 2 to the sink node 1, and is, in other words, a parameter that enables the sink node 1, by acquiring the wireless communication parameter, to judge the length of the communication time period to be allocated for transmission of transmission information from the sensor node 2. Next, the transmission confirmation unit 203 is a functional unit that confirms whether transmission information from the sensor node 2 has been received by the sink node 1 and transmission thereof has been completed. Specifically, the transmission confirmation unit 203 confirms that transmission of the transmission information has been completed, by receiving an acknowledgement signal that is issued from the sink node 1 after having received all of the packets constituting the transmission information.

Next, the communication unit 21 is a functional unit that performs communication, that is, transmission and reception of information, with devices external to the sensor node 2. Specifically, the communication unit 21 is formed so as to interact with the control unit 20. As a result, the communication unit 21 administers processing such as transmission of transmission information generated by the transmission information generation unit 201, transmission of wireless communication parameter information generated by the wireless communication parameter information generation unit 202, and reception of the acknowledgement signal. The measurement unit 23 is a functional unit that measures the temperature in the environment in which the sensor node 2 is disposed via the temperature sensor 2a. The temperature measurement by this measurement unit 23 is executed under the direction of the control unit 20, and the measured temperature information is stored to the memory by the measurement information recording unit 24 as the need arises. This measurement information recording unit 24 is formed so as to interact with the control unit 20, and, in accordance with instructions from the control unit 20, recorded measurement information will be delivered to the control unit 20, and transmission information will be generated by the transmission information generation unit 201.

Figure 3:
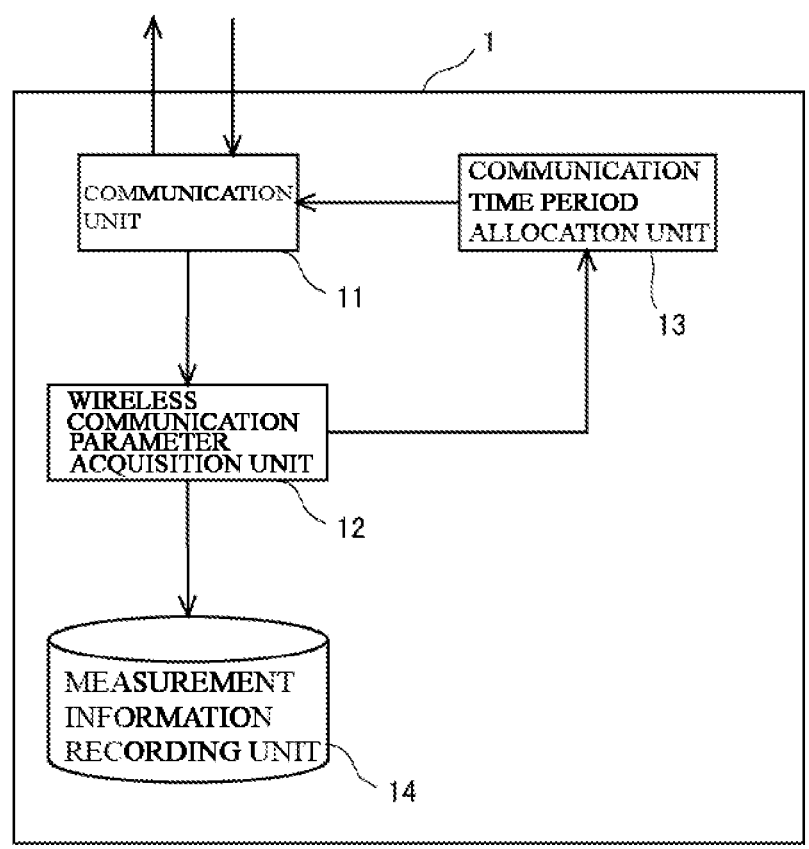
FIG. 3 is a functional block diagram of a sink node that is included in the sensor network system shown in FIG. 1.

Next, functional units that are formed in the sink node 1 will be described, based on FIG. 3. The sink node 1 has a communication unit 11, a wireless communication parameter acquisition unit 12, a communication time period allocation unit 13, and a measurement information recording unit 14. The communication unit 11 is a functional unit that performs control relating to processing such as receiving wireless communication parameter information and transmission information from each sensor node, and issuing the acknowledgement signal. The wireless communication parameter acquisition unit 12 is a functional unit that extracts and acquires the wireless communication parameter that is included in the wireless communication parameter information received by the communication unit 11. This acquired wireless communication parameter is then delivered to the communication time period allocation unit 13, and the communication time period allocation unit 13 is a functional unit that adjusts the communication time period for transmission of transmission information that is allocated to the sensor node from which the wireless communication parameter was transmitted, based on the wireless communication parameter. Also, the temperature information that is included in the transmission information that is transmitted from each sensor node is delivered to the measurement information recording unit 14, and the measurement information recording unit 14 records that temperature information to the memory.

Figure 4:
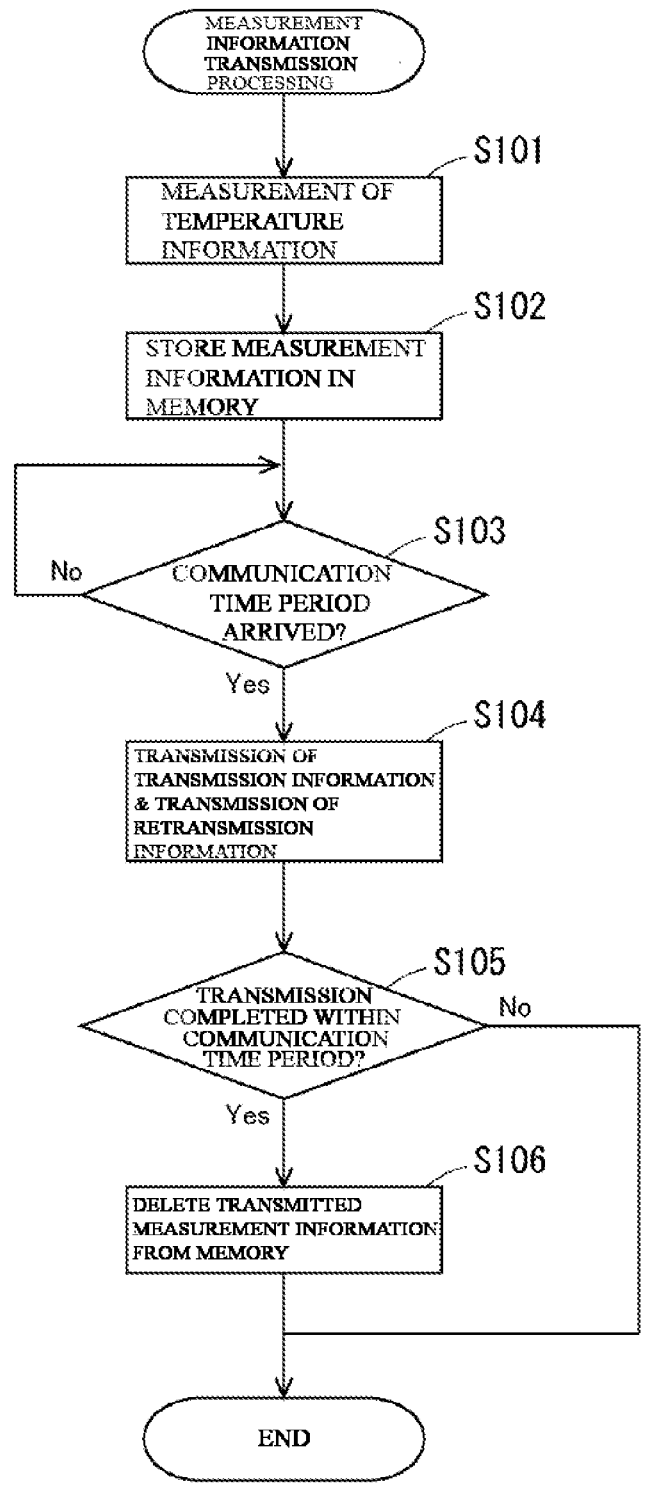
FIG. 4 is a flowchart of measurement information transmitting processing for transmitting measurement information that is executed in the sensor node.

Transmission of transmission information relating to collection of temperature information between the sensor node 2 and the sink node 1 that are constituted in this manner will be described. Transmission of this transmission information is realized by measurement information transmission processing, shown in FIG. 4, that is executed on the sensor node 2 side, and by measurement information reception processing, shown in FIG. 6, that is executed on the sink node 1 side.

Also, the data structure of the transmission information and the wireless communication parameter information that is transmitted from the sensor node 2 to the sink node 1 is schematically shown in FIG. 5. Note that, in the present embodiment, the retransmission frequency for each packet when the sensor node 2 has transmitted a packet constituting transmission information is utilized as the wireless communication parameter (hereinafter, also simply referred to as the "retransmission frequency"). This takes into consideration the fact that a correlation is discernible between the wireless communication environment and the retransmission frequency, such as the retransmission frequency increasing, in the case where the wireless communication environment between the sensor node 2 and the sink node 1 deteriorates.

In view of this, the data structure of the transmission information and the wireless communication parameter information that are generated with the sensor node 2 based on FIG. 5 will be described, prior to description of the measurement information transmission processing and the measurement information reception processing. FIG. 5 schematically shows the data structure of the entire transmission information, and the transmission information is schematically classified into eight data areas. In the present embodiment, the five particularly important data areas a1 to a5 among eight data areas will be described. An area a1 (Start Symbol) is a specific byte sequence showing the beginning of the transmission information or the wireless communication parameter information. Accordingly, the byte sequence that is stored in the area a1 in the case of transmission information differs from the byte sequence that is stored in the area a1 in the case of wireless communication parameter information. An area a2 (Destination Address) represents the address of the destination (sink node 1 in the case of the present embodiment) to which the transmission information or the wireless communication parameter information is ultimately transmitted. An area a3 (Source Address) represents the address of the source (sensor node 2 in the case of the present embodiment) of the transmission information or the wireless communication parameter information. An area a4 (Data) represents the temperature information (corresponds to the measurement information according to the present invention) or the wireless communication parameter (corresponds to the predetermined wireless communication parameter according to the present invention, and, in the present embodiment, is the retransmission frequency for each packet) detected by the temperature sensor 22 mounted in the sensor node 2, which is the source. An area a5 (Terminator Symbol for Data) is a specific byte sequence showing the end of the transmission information or the wireless communication parameter information.

Transmission Processing of Temperature Information

Here, returning to FIG. 4, the measurement information transmission processing that is executed by the sensor node 2 for transmission processing of temperature information will be described. This measurement information transmission processing is processing for measuring temperature information in the sensor node 2 and transmitting the measured temperature information to the sink node 1, and continuous collection of temperature information by the sensor node 2 will be assisted, by this processing being executed repeatedly. Specifically, first, in S101, measurement of temperature information is performed by the measurement unit 23 through the sensor 2a. Note that the total data volume of this measured temperature information is set so as to be a data volume capable of being transmitted within the communication time period allocated for the sensor node 2, assuming that transmission from the sensor node 2 is to be finished within this communication time period. When the processing of S101 has been completed, the processing proceeds to S102.

In S102, the temperature information measured at S101 is stored in the memory of the sensor node 2. Note that this storage is temporary storage for information transmission from the sensor node 2 to the sink node 1, and, in principle, when that information transmission has been completed, the stored temperature information is deleted from the memory (see the processing of S106 discussed later), and the capacity of the memory is secured. When the processing of S102 has been completed, the processing proceeds to S103.

In S103, it is determined whether the communication time period, allocated by the communication time period allocation unit 13 of the sink node 1, in which the sensor node 2 can transmit transmission information to the sink node 1 has arrived. As abovementioned, between each sensor node and the sink node 1 that belong to the system 10, the control time that is used by the respective nodes are synchronized, and thus it is possible to judge that the communication time period has arrived in accordance with that control time. Note that the information relating to the communication time period allocated to the sensor node 2 by the communication time period allocation unit 13 of the sink node 1 is transmitted to the sensor node 2 by communication from the communication unit 11 of the sink node 1 to the communication unit 21 of the sensor node 12, and is held by the control unit 20 of the sensor node 2. When it is determined in the affirmative in the processing of S103, the processing proceeds to S104, and when it is determined in the negative, the processing of S103 is performed again.

In S104, in the sensor node 2, transmission information is generated by the transmission information generation unit 201, and transmission thereof is performed. Furthermore, based on the retransmission frequency, for each packet of transmission information, that occurs at the time of transmission of the transmission information, wireless communication parameter information is generated by the wireless communication parameter information generation unit 202 and transmission thereof is performed. Specifically, when packet of transmission information is transmitted from the sensor node 2 to the sink node 1, retransmission of packet that failed to be transmitted is performed. This retransmission frequency for each packet is included in the wireless communication parameter information as a wireless communication parameter, and will be transmitted to the sink node 1. When the processing of S104 has been completed, the processing proceeds to S105.

In S105, it is determined whether transmission of the transmission information was completed within the communication time period. Specifically, if the sensor node 2 receives the acknowledgement signal relating to the transmission information, sent to the sensor node 2 from the sink node 1, within the communication time period, the determination of S105 will be an affirmation determination, and if this is not the case, the determination of S105 will be a negative determination. Note that when it is determined in the negative at S105, this means that transmission information that should originally have been transmitted within the communication time period could not be transmitted, and thus the temperature information that is included in the transmission information that is in an untransmitted state will be held in the memory of the sensor node 2. This untransmitted temperature information that is stored will be again included in the transmission information and transmitted to the sink node 1, in the next communication time period. On the other hand, when it is determined in the affirmative in S105, transmission information that originally should have been transmitted within the communication time period can be transmitted, and, in S106, the temperature information whose transmission has been completed is deleted from the memory of the sensor node 2. The limited capacity of the memory can thereby be efficiently used.

Figure 6:
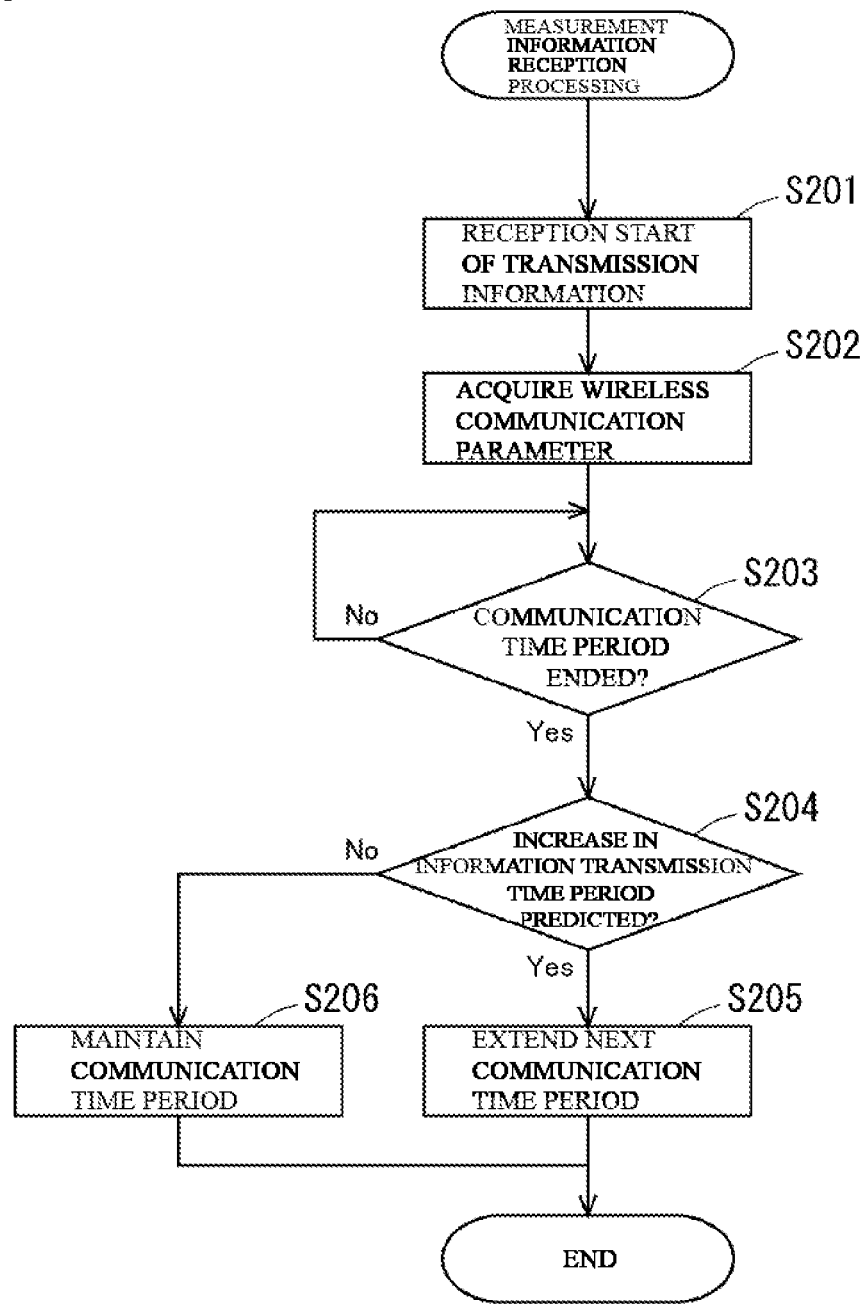
FIG. 6 is a flowchart of measurement information reception processing for receiving measurement information that is executed in the sink node.

Next, the measurement information reception processing that is executed in the sink node 1 for transmission processing of temperature information will be described, based on FIG. 6. This measurement information reception processing is processing that is executed cooperatively with the measurement information transmission processing and that involves transmission information and wireless communication parameter information from the sensor node 2 being received in the sink node 1, and continuous collection of temperature information by the sink node 1 will be assisted, by this processing being executed repeatedly. Note that the measurement information reception processing shown in FIG. 6 is processing that is performed by the sink node 1 on transmission information from the sensor node 2, and that, with regard the sensor node 3, different measurement information reception processing will be performed independently of this measurement information reception processing.

Specifically, first, at S201, reception of transmission information transmitted from the sensor node 2 is started with the arrival of the communication time period allocated to the sensor node 2. Thereafter, in S202, wireless communication parameter information transmitted from the sensor node 2 is then received, and "retransmission frequency" serving as the wireless communication parameter that is included therein is acquired. Thereafter, at S203, it is determined whether the communication time period that is allocated to the sensor node 2 has ended. When it is determined in the affirmative at S203, the processing proceeds to S204, and when it is determined in the negative, the processing of S203 is performed again.

In S204, it is determined whether an increase in the information transmission time period required for transmission of the transmission information from the sensor node 2 to the sink node 1 is predicted, or in other words, whether the information transmission time period is predicted to exceed the communication time period that is allocated at the present point in time, based on the retransmission frequency serving as the wireless communication parameter acquired at S202. As abovementioned, the retransmission frequency is a parameter reflecting the wireless communication environment between the sensor node 2 and the sink node 1, with a tendency for the retransmission frequency to increase as the wireless communication environment deteriorates, and the information transmission time period to become longer being discernible.

Here, the prediction relating to an increase in the information transmission time period will be described, based on FIG. 7. FIG. 7 shows the correlation between packets and integrals of the retransmission frequency of each packet, when transmission information that is formed with a predetermined number of packets (in the example shown in FIG. 7, the number of packets is 10) is transmitted with the processing of S104, in one communication time period that is allocated to the sensor node 2. In the configuration shown in the upper part (a) of FIG. 7, the slope (dx/dy) of the integral retransmission frequency relative to the number of packets that is calculated with a least-squares method, when the transmission information that is formed with ten packets is transmitted, is 0.4242, and the calculated value of the integral retransmission frequency is 4.242. On the other hand, in the configuration shown in the lower part (b) of FIG. 7, the slope (dx/dy) of the integral retransmission frequency relative to the number of packets that is calculated with a least-squares method is 2.0727, and the calculated value of the integral retransmission frequency is 20.727.

Here, with regard to the prediction relating to an increase in the information transmission time period, various prediction techniques can be adopted, in accordance with the degree of stability that is demanded with respect to transmission of transmission information from the sensor node 2 to the sink node 1, and three prediction techniques are illustrated below.

Prediction Technique 1

It may be determined that an increase in the information transmission time period will occur, when the slope (dx/dy) of the integral retransmission frequency with respect to the number of packets calculated based on the correlation between the packets and the integral of the retransmission frequency of each packet as shown in FIG. 7 exceeds a predetermined threshold value. In this case, the wireless communication environment between the sensor node 2 and the sink node 1 deteriorates at a faster rate as the slope increases, and the prediction determination is performed, based on the idea that the communication time period is preferably extended such that transmission of transmission information can be finished within the communication time period as much as possible. In the case of applying this prediction technique, in the configuration shown in FIG. 7(*a*), for example, an increase in the information transmission time period will not be predicted, whereas in the configuration shown in FIG. 7(*b*), an increase in the information transmission time period will be predicted.

Prediction Technique 2

It may be determined that an increase in the information transmission time period will occur, when the integral retransmission frequency calculated based on the correlation between the packets and the integral of the retransmission frequency of each packet as shown in FIG. 7 exceeds a retransmission frequency serving as a reference. In this case, the wireless communication environment between the sensor node 2 and the sink node 1 enters a more deteriorated state as the integral retransmission frequency increases, and the prediction determination is performed, based on the idea that the communication time period is preferably extended such that transmission of transmission information can be finished within the communication time period as much as possible. In the case of applying this prediction technique, in the configuration shown in FIG. 7(*a*), for example, an increase in the information transmission time period will not be predicted, whereas in the configuration shown in FIG. 7(*b*), an increase in the information transmission time period will be predicted.

Prediction Technique 3

It may be determined that an increase in the information transmission time period will occur, when the integral retransmission frequency calculated based on the correlation between the packets and the integral of the retransmission frequency of each packet as shown in FIG. 7 exceeds a warning retransmission frequency serving as a reference. The warning retransmission frequency serving as a reference is a smaller value than the retransmission frequency serving as a reference in the prediction technique 2, and, in this case, the prediction determination is performed, based on the idea that the communication time period is preferably extended such that transmission of transmission information can be finished within the communication time period for realization of reliable information transmission, since there exists an undeniable possibility of not being able to finish transmitting transmission information within the communication period that is allocated at the present point in time, in the case where the integral retransmission frequency exceeds the warning retransmission frequency serving as a reference. In the case of applying this prediction technique, in the configurations shown in FIG. 7(*a*) and FIG. 7(*b*), for example, an increase in the information transmission time period will be predicted.

Note that the abovementioned prediction techniques are by way of example, and prediction techniques other than the above may be adopted. The prediction determination results shown in each prediction technique are also merely by way of example, and the scope of rights of the instant invention is not limited to those results.

Here, the description returns to FIG. 6. When it is determined in the affirmative at S204, that is, when an increase in the information transmission time period is predicted, the processing proceeds to S205 and when it is determined in the negative, the processing proceeds to S206. In S205, the communication time period that is allocated to the sensor node 2 is extended for transmission information that will be received next after the transmission information received at S201, that is related to the retransmission frequency that forms the basis of the prediction of an increase in the information transmission time period. As a result of a communication time period that depends on a wireless communication environment in which the sensor node 2 and the sink node 1 are in a deteriorated state being allocated, it thereby becomes possible to more reliably transmit transmission information from the sensor node 2 to the sink node 1 within the communication time period, and enables the occurrence of transmission information in the sensor node 2 that has not been transmitted to be suppressed.

Note that extension processing of S205 is performed by the communication time period allocation unit 13, and the information on the extended communication time period is conveyed from the sink node 1 to the sensor node 2. Also, the extent of the extension of the communication time period in S205 is adjusted according to the deteriorated state between the sensor node 2 and the sink node 1. For example, when the slope (dx/dy) of the integral retransmission frequency with respect to the number of packets exceeds the predetermined threshold value in the case where the prediction of S204 is performed with the prediction technique 1, the communication time period can be extended longer as the slope increases.

Also, in S206, the communication time period that is allocated to the sensor node 2 is maintained as is, given that an increase in the information transmission time period is not predicted. The communication time period being needlessly lengthened can thereby be avoided.

Figure 8:
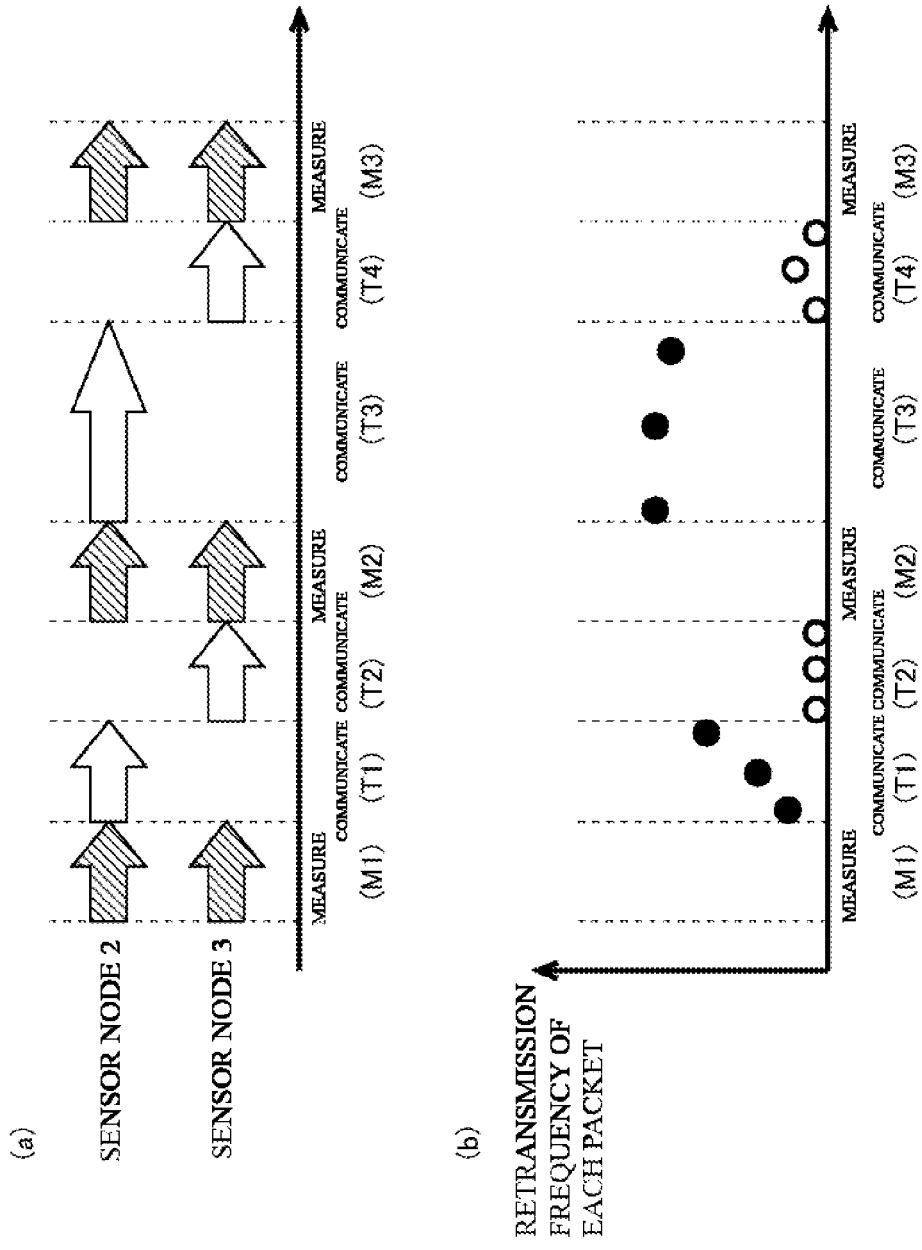
FIG. 8 illustrates diagrams (a) and (b) schematically showing a communication situation between nodes in the sensor network system shown in FIG. 1, and a retransmission situation of packets that are transmitted via wireless communication between nodes.

Here, the upper part (a) of FIG. 8 shows the communication situation between the sensor nodes 2 and 3 and the sink node 1 when the measurement information transmission processing and the measurement information reception processing described heretofore are performed, and the lower part (b) of FIG. 8 schematically shows the retransmission situation of packets that are transmitted via wireless communication between each sensor node and the sink node 1.

In FIG. 8(a), measurement of temperature information in each sensor node is shown with shaded arrows, and transmission of transmission information from each sensor node to the sink node 1 is shown with white arrows. Accordingly, for example, at a time period M1, measurement of temperature information is performed in each sensor node, transmission information that includes the measured temperature information is transmitted to the sink node 1 from the sensor node 2 in a subsequent time period T1, and, furthermore, transmission information that includes the measured temperature information is transmitted to the sink node 1 from the sensor node 3 in a subsequent time period T2.

Also, in FIG. 8(b), change in the retransmission frequency of packets constituting the transmission information when the transmission information is transmitted from each node sensor is shown. Note that the black dots shown in FIG. 8(b) indicate change in the retransmission frequency relating to the sensor node 2 and the white dots indicate change in the retransmission frequency relating to the sensor node 3, with the numbers of dots being merely for schematically indicating change in the retransmission frequency, rather than corresponding to the number of packets constituting the transmission information. Accordingly, in transmission of transmission information from the sensor node 2 in the time period T1, for example, the retransmission frequency gradually increases, reflecting deterioration in the wireless communication environment between the sensor node 2 and the sink node 1, whereas, in transmission of transmission information from the sensor node 3 in the time period. T1, the retransmission frequency correspondingly transitions at a low value, reflecting the stability of the wireless communication environment between the sensor node 2 and the sink node 1.

As a result of the measurement information transmission processing and the measurement information reception processing being executed, an increase in the information transmission time period from the sensor node 2 is predicted based on the transition of the retransmission frequency in the time period T1, and, therefore, a time period T3 corresponding to the communication time period that is allocated to the sensor node 2 following the time period T1 will be extended. Even if the retransmission frequency is comparatively high, reflecting deterioration of the wireless communication environment between the sensor node 2 and the sink node 1, it thereby becomes possible to finish transmitting the transmission information to the sink node 1 within the extended communication time period. On the other hand, with regard to the sensor node 3, since the retransmission frequency is correspondingly a low value in the time period T2, a time period T4 corresponding to the communication time period that is allocated to the sensor node 3 following the time period T2 will be maintained by the same length as the time period T2.

Modification 1

In the above measurement information reception processing, the communication time period allocated to the sensor node 2 is extended, utilizing retransmission frequency serving as the wireless communication parameter sent from the sensor node 2. However, in the case where information transmission is not possible between the sensor node 2 and the sink node 1, a large number of packet retransmissions will in actuality be repeatedly performed from the sensor node 2, although a configuration may be adopted in which extension processing of the communication time period is not performed. Since the communication time period will be needlessly prolonged despite an ongoing state in which no transmission information can be transmitted to the sink node 1 when extension processing of the communication time period is performed in the case where information transmission is not possible, there is a risk that the collection efficiency of temperature information of the system 10 may conversely fall. In view of this, in the case where information transmission is not possible, collection of temperature information by the sensor node 2 can be suspended, until the state in which information transmission is not possible is resolved, or collection of temperature information can be performed as long as the storage capacity of the memory of the sensor node 2 permits, and thereafter, the measurement information transmission processing and the measurement information reception processing can be executed, after waiting for the state in which information transmission is not possible to be resolved.

Second Embodiment

Figure 9:
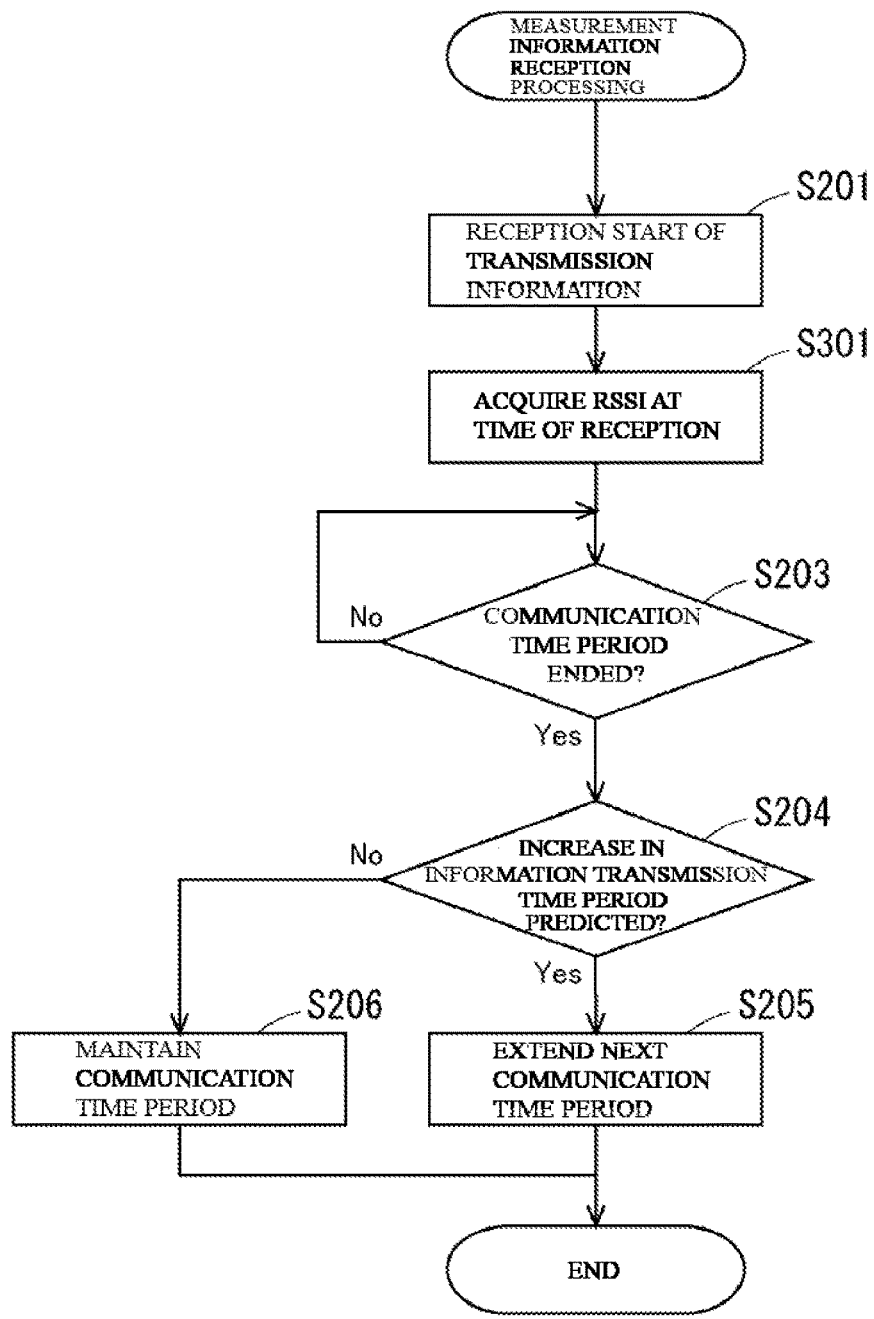
FIG. 9 is a flowchart of second measurement information reception processing for receiving measurement information that is executed in the sink node.

A second embodiment of transmission processing of temperature information according to the present invention will be described based on FIG. 9. FIG. 9 shows a flowchart of measurement information reception processing according to the present embodiment, with the same reference numerals being given to processing that is the same as that included in the measurement information reception processing shown in FIG. 6 out of the processing included therein, and detailed description thereof being omitted. Here, in the present embodiment, a wireless communication parameter is generated on the sink node 1 side. Accordingly, in the measurement information transmission processing according to the present embodiment, on the sensor node 2 side, transmission information including temperature information is generated and this transmission information is transmitted to the sink node 1, whereas wireless communication parameter information including the retransmission frequency and the like which are wireless communication parameters is not generated.

Specifically, as shown in FIG. 9, when the processing of S201 has ended, processing of S301 is performed. In S301, the RSSI (Received Signal Strength Indicator) of transmission information at the time of reception of the transmission information at S201 is acquired. The RSSI of the sink node 1 is thought to reflect the ease with which information reaches the sink node 1 from the sensor node 2, and thus can be adopted as a wireless communication parameter. Accordingly, the RSSI acquired at S301 is utilized in the prediction determination of an increase in the information transmission time period in S204 thereafter. Specifically, in the case where the rate of decline of the acquired RSSI is larger than a predetermined threshold value, the wireless communication environment from the sensor node 2 to the sink node 1 is in a deteriorating state, and it is possible to rationally predict that an increase in the information transmission time period may arise.

In the case where an increase in the transmission time period is predicted utilizing the RSSI which is a wireless communication parameter generated on the sink node 2 side in this manner, the next communication time period that is allocated to the sensor node 2 is extended by the processing of S205. Since a communication time period that takes account of the wireless communication environment will thereby be allocated when transmission information is next transmitted, efficient collection of temperature information is realized.

Third Embodiment

Figure 10:
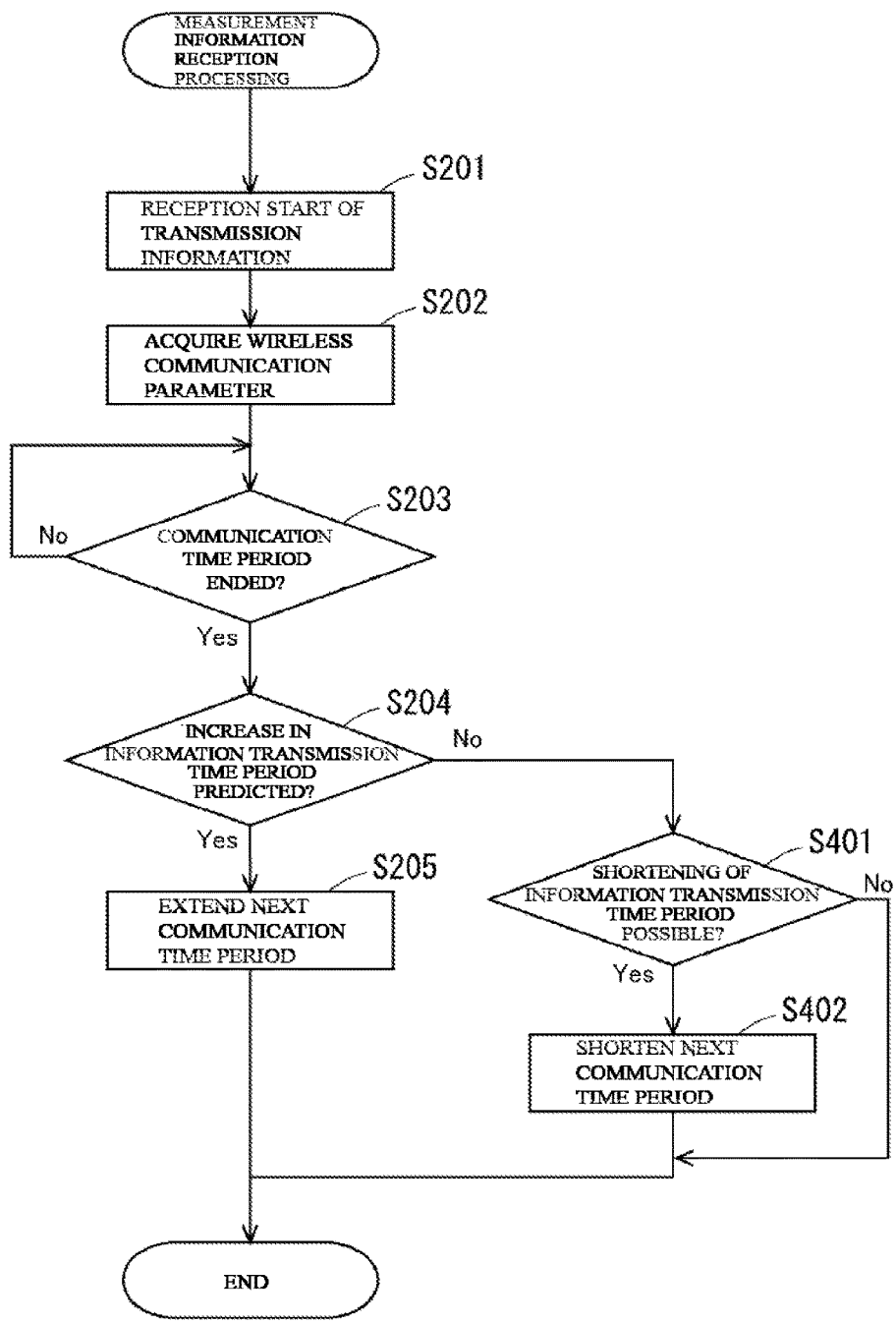
FIG. 10 is a flowchart of third measurement information reception processing for receiving measurement information that is executed in the sink node.

A third embodiment of transmission processing of temperature information according to the present invention will be described based on FIG. 10. FIG. 10 shows a flowchart of measurement information reception processing according to the present embodiment, with the same reference numerals being given to processing that is the same as that included in the measurement information reception processing shown in FIG. 6 out of the processing included therein, and detailed description thereof being omitted. Here, the present embodiment refers to shortening the communication time period extended by the processing of S205.

Specifically, as shown in FIG. 10, the processing of S401 will be performed when it is determined in the negative at S204. In S401, it is determined whether shortening of the information transmission time period required for transmission of transmission information from the sensor node 2 to the sink node 1 is possible, based on the retransmission frequency which serves as the wireless communication parameter acquired at S202. Specifically, in cases such as when the slope (dx/dy) of the integral retransmission frequency with respect to the number of packets is less than a predetermined threshold value, when the integral retransmission frequency is less than a retransmission frequency that serves as a reference, or when the integral retransmission frequency is less than a warning retransmission frequency that serves as a reference, with reference to the prediction techniques 1 to 3 relating to abovementioned increase in the information transmission time period, it can be judged that shortening of the information transmission time period is possible. Furthermore, as a different technique, it can also be judged that shortening of the information transmission time period is possible, in the case where the communication time period actually required for reception of transmission information performed at S201 to S203 is a shorter time period than the communication time period that was extended and set, without utilizing the retransmission frequency which serves as a wireless communication parameter. When it is determined in the affirmative at S401, the processing proceeds to S402 and this control is ended.

In S402, the communication time period that is allocated to the sensor node 2 is shortened for transmission information that will be received next after the transmission information received at S201. The communication time period being needlessly extended is thereby avoided, and efficient collection of temperature information is realized. Note that the shortening processing of S402 is performed by the communication time period allocation unit 13, and the information on the shortened communication time period is conveyed from the sink node 1 to the sensor node 2. Also, with regard to the extent of the shortening of the communication time period in S402, in the case where the slope (dx/dy) of the integral retransmission frequency with respect to the number of packets is less than a predetermined threshold value, for example, the communication time period can be shortened more as the slope decreases.

Other Embodiments

In the transmission processing of temperature information described heretofore, transmission of transmission information from the sensor node 2 to the sink node 1 is performed, a wireless communication parameter relating to this transmission information is acquired, and the communication time period that is allocated for transmission information to be transmitted next after this transmission information is adjusted. That is, subsequent measurement information according to the present invention will be temperature information that is included in transmission information transmitted directly after the transmission information related to the acquired wireless communication parameter. Instead of such a mode, subsequent measurement information according to the present invention may be temperature information that is included in transmission information that is transmitted at a time when a given period has opened up from the transmission information related to the acquired wireless communication parameter. For example, the sink node 1 may acquire the wireless communication parameter at the time of transmission of transmission information that includes temperature information measured at a specific time on the previous day, and may be used in adjustment of the communication time period for transmission of transmission information that includes the temperature information of the next day. Such a utilization mode is useful in cases such as where the wireless communication environment shows a specific deterioration tendency at a specific time of day.

INDEX TO THE REFERENCE NUMERALS

1 . . . Sink node
2, 3 . . . Sensor node
10 . . . Sensor network system (system)

The invention claimed is:

1. A sink node in which measurement information in each of one or more sensor nodes is collected via wireless communication with the one or more sensor nodes, which each have a sensor that measures a predetermined environmental parameter and a memory that stores measurement information measured by the sensor, the sink node comprising a processor configured with a program to perform operations comprising:

operation as a communication unit configured to receive the measurement information from a target sensor node, which measured the measurement information;

operation as a communication time period allocation unit configured to allocate, to the target sensor node, a communication time period for transmission of the measurement information by the target sensor node so as to not overlap with a communication time period for transmission of measurement information by a sensor node other than the target sensor node among the one or more sensor nodes; and operation as a wireless communication parameter acquisition unit configured to acquire a predetermined wireless communication parameter related to a wireless communication environment between the target sensor node and the sink node, concerning transmission of the measurement information by the target sensor node, wherein the processor is configured with the program to perform operations such that the communication time period allocation unit adjusts a communication time period allocated for subsequent measurement information, the subsequent measurement information comprising measurement information to be transmitted after the measurement information in the target sensor node, based on the predetermined wireless communication parameter acquired by the wireless communication parameter acquisition unit, the processor is configured with the program to perform operations such that the wireless communication parameter acquisition unit acquires the predetermined wireless communication parameter generated by the target sensor node via the communication unit, and the predetermined wireless communication parameter comprises a retransmission frequency of a retransmission of the measurement information between the target sensor node and the sink node in the communication time period that is allocated to the target sensor node.

2. The sink node according to claim 1, wherein:
the processor is configured with the program to perform operations such that the communication time period allocation unit is further configured to:
   predict, based on the predetermined wireless communication parameter acquired by the wireless communication parameter acquisition unit, that an information transmission time period required for transmission of the measurement information between the target sensor node and the sink node will become longer than the communication time period allocated to the target sensor node before adjustment by the communication time period allocation unit, and
   predict an increase in the information transmission time period by comparing one of: the retransmission frequency; and a retransmission parameter associated with the retransmission frequency with a predetermined threshold value; and
   extending the communication time period allocated for the subsequent measurement information in the target sensor node, when an increase in the information transmission time period is predicted.

3. The sink node according to claim 1, wherein the processor is configured with the program to perform operations such that the communication time period allocation unit, when information transmission between the target sensor node and the sink node is not possible, does not perform adjustment of the communication time period for the subsequent measurement information in the target sensor node.

4. An information collection method of a sink node in which measurement information measured by each of one or more sensor nodes is collected, via wireless communication with the one or more sensor nodes, which each have a sensor that measures a predetermined environmental parameter and a memory that stores measurement information measured by the sensor, the method comprising:
   receiving the measurement information from a target sensor node which measured the measurement information;
   allocating, to the target sensor node, a communication time period for transmission of the measurement information by the target sensor node, so as to not overlap with a communication time period for transmission of measurement information by a sensor node other than the target sensor node among the one or more sensor nodes;
   acquiring a predetermined wireless communication parameter from the target sensor node, the predetermined wireless communication parameter being a retransmission frequency of a retransmission of the measurement information between the target sensor node and the sink node in the communication time period that is allocated to the target sensor node; and
   adjusting a communication time period allocated for subsequent measurement information to be transmitted after the measurement information in the target sensor node, based on the acquired predetermined wireless communication parameter.

5. A non-transitory computer-readable medium stored with an information collection program for causing a sink node in which measurement information measured by each of one or more sensor nodes is collected, via wireless communication with the one or more sensor nodes, which each have a sensor that measures a predetermined environmental parameter and a memory that stores measurement information measured by the sensor, the information collection program configured to cause a processor to perform operations comprising:
   receiving the measurement information from a target sensor node which is the sensor node that measured the measurement information;
   allocating, to the target sensor node, a communication time period for transmission of the measurement information by the target sensor node, so as to not overlap with a communication time period for transmission of measurement information by a sensor node other than the target sensor node among the one or more sensor nodes;
   acquiring a predetermined wireless communication parameter from the target sensor node, the predetermined wireless communication parameter being a retransmission frequency of a retransmission of the measurement information between the target sensor node and the sink node in the communication time period that is allocated to the target sensor node; and
   adjusting a communication time period allocated for subsequent measurement information to be transmitted after the measurement information in the target sensor node, based on the acquired predetermined wireless communication parameter.

* * * * *